United States Patent
Sonnemann et al.

(10) Patent No.: US 7,143,647 B2
(45) Date of Patent: Dec. 5, 2006

(54) ANALYZER UNIT FOR THE MEASURING SIGNAL OF A MICROMECHANICAL SENSOR

(75) Inventors: Markus Sonnemann, Reutlingen (DE); Christoph Gahn, Stuttgart (DE); Uwe Rauscher, Hohenstein (DE)

(73) Assignee: Robert Bosch GmbH, Stuttgart (DE)

( * ) Notice: Subject to any disclaimer, the term of this patent is extended or adjusted under 35 U.S.C. 154(b) by 15 days.

(21) Appl. No.: 10/916,077

(22) Filed: Aug. 10, 2004

(65) Prior Publication Data

US 2005/0061074 A1    Mar. 24, 2005

(51) Int. Cl.
  *G01P 15/04*    (2006.01)
  *G06F 19/00*   (2006.01)
(52) U.S. Cl. .............. 73/488; 73/116; 73/494; 702/45; 702/100
(58) Field of Classification Search ............... 73/488, 73/593, 602, 660; 702/109, 113, 116, 45, 702/100
See application file for complete search history.

(56) References Cited

U.S. PATENT DOCUMENTS

| | | | |
|---|---|---|---|
| 5,637,798 A * | 6/1997 | Schatz .................. | 73/514.32 |
| 5,914,882 A * | 6/1999 | Yeghiazarians ............ | 700/177 |
| 6,308,554 B1 * | 10/2001 | Mattes et al. ............. | 73/1.37 |
| 6,315,074 B1 * | 11/2001 | Achhammer et al. ........ | 180/282 |
| 6,598,475 B1 * | 7/2003 | Pinson ................... | 73/504.12 |
| 6,839,643 B1 * | 1/2005 | Kanke et al. .............. | 702/45 |
| 2005/0160831 A1 * | 7/2005 | Hopf et al. ................ | 73/780 |

FOREIGN PATENT DOCUMENTS

DE    30 49 53-1    9/1981

* cited by examiner

*Primary Examiner*—Hezron Williams
*Assistant Examiner*—Jacques M Saint-Surin
(74) *Attorney, Agent, or Firm*—Kenyon & Kenyon LLP

(57) ABSTRACT

An analyzer unit for the measuring signal of a micromechanical sensor having an input/output characteristic which is represented as a characteristic curve includes means for analog-digital conversion of the measuring signal and transmission means for transmission of the converted measuring signal or a signal that depends on the converted measuring signal. The transmission means is designed so that the characteristic curve has at least two ranges having different slopes. Different resolutions of the measuring signal are implemented through the different slopes of the characteristic curve. A suitably resolved signal is thus made available for applications having different sensitivity requirements.

12 Claims, 4 Drawing Sheets

ANALYZER UNIT FOR THE MEASURING SIGNAL OF A MICROMECHANICAL SENSOR

BACKGROUND INFORMATION

Micromechanical sensors are being used to an increasing extent for detection of physical measured quantities such as pressure, temperature, acceleration, yaw rate, etc., in motor vehicles in particular. An analyzer unit is generally connected downstream from the actual measured quantity pickup to generate an electric signal representing the measured quantity, such that the signal is suitable for information transmission and for controlling or regulating preselectable variables. Unpublished Patent Application No. DE 304 953-1 describes such an analyzer unit containing an analog-digital converter (A/D converter) and subsequent digital information transmission.

A single measured quantity of those indicated above is often needed for controlling or regulating multiple preselectable variables. If these variables have different requirements with regard to the sensitivity and measuring range of the measuring signal, then two or more sensors and/or analyzer units must be used for measured quantity pickup and transmission.

SUMMARY OF THE INVENTION

The present invention is directed to an analyzer unit for the measuring signal of a micromechanical sensor having an input/output characteristic which is represented as a characteristic curve. It includes means for analog-digital conversion of the measuring signal and transmission means for transmission of the converted measuring signal or a signal that depends on the converted measuring signal. A core of the present invention is the design of transmission means so that the characteristic curve has at least two ranges having different slopes.

The analyzer unit according to the present invention for the measuring signal of a micromechanical sensor has the advantage that only a single sensor and/or a single analyzer unit is needed.

It is advantageous that different resolutions of the measuring signal are implemented through the different slopes of the characteristic curve. A suitably resolved signal is made available to applications having different sensitivity requirements.

In an advantageous embodiment of the present invention, the characteristic curve has at least two linear ranges having different slopes. This embodiment fulfills in particular the requirements of applications in which a linear characteristic curve is required and there is no overlapping of the value ranges of the different applications.

In another advantageous embodiment of the present invention, the characteristic curve is represented by a functional relationship, in particular an exponential, logarithmic, or polynomial relationship. With such characteristic curves, functional relationships between measured quantity and controlled variable may be represented in the analyzer unit itself. The functional relationship may be represented in particular by a computing unit, e.g., a microprocessor.

According to another advantageous embodiment of the present invention, the characteristic curve is represented by a transmission function, a freely selectable transmission function in particular. During operation, for example, a corresponding characteristic curve may be loaded or selected in a controlled manner via an external input to the analyzer unit as a function of the application currently processing the signal. It is also conceivable for the characteristic curve to be altered in a controlled manner via an external input to the analyzer unit when a certain measured value is too high or too low so that the measuring range is switched.

In another advantageous embodiment of the present invention, the transmission function is stored in discrete values in a memory, the output value belonging to the digitized measured value being determined via a comparator device based on this memory. This design minimizes the computation complexity, which also makes the analyzer unit according to the present invention more economical. It is also possible with the same mechanical and electronic design to adapt the sensor and analyzer unit on the basis of the characteristic curve stored in the memory for completely different applications such as navigation or rollover detection. It is also conceivable here for the memory to contain multiple predefined characteristic curves or for new characteristic curves to be written into the memory of the analyzer unit via an external input during operation. It is also possible to provide each of multiple transmission means in the analyzer unit with its own output. Different characteristic curves are then made available at the outputs, these characteristic curves being suitable for controlling or regulating various preselectable variables.

Another advantageous embodiment involves a digital signal, in particular having a serial protocol according to the serial peripheral interface (SPI) standard, being output at the output and/or an analog signal being output at the output after a digital-analog conversion. An analog interface and a well-defined digital interface according to an industrial standard may thus be provided between the analyzer unit and its environment. This in turn reduces costs, in particular for adaptation work.

In another advantageous embodiment of the present invention, the value range represented by the characteristic curve and the resolution of the characteristic curve are defined by a suitable word width of the digital output signal and/or a suitable voltage range of the analog output signal. This embodiment is particularly advantageous when the physical measuring range of the sensor connected to the analyzer unit is larger than the value range representable by the characteristic curve.

The micromechanical sensor for whose measuring signal the analyzer unit according to the present invention is intended may be in particular a yaw rate sensor, an acceleration sensor, an oil pressure sensor, a gas sensor, an air flow sensor, or a temperature sensor.

The analyzer unit according to the present invention is particularly advantageous when the output values from the ranges of different slopes are processed by at least two different applications in a motor vehicle. Thus in particular rollover detection in the airbag control unit and rollover prevention in conjunction with the electronic stability program (ESP) are two applications which process the movements about the same axis of rotation of a vehicle, i.e., the longitudinal axis (rolling axis). Rollover detection requires a large measuring range with a low resolution for the yaw rate to detect a sudden rollover. Rollover prevention should detect even a gradual lateral lifting of the vehicle and therefore requires a yaw rate which is represented with a high resolution and a low measuring range for the regulating function. In addition, for example, it is possible to link the cornering detection for navigation with detection of skidding movements of the vehicle for ESP because these are also two movements about the same axis of rotation, i.e., the yaw axis of the vehicle. Only a small measuring range of the yaw rate is necessary when there are changes in direction as part of navigation, e.g., turning. For continuous determination of the direction in which the vehicle is traveling, however, even very minor changes in the yaw rate must be represented. If the vehicle begins to skid, very high yaw rates must be represented with a low resolution. Each of these applications has previously been supplied with a common measured quantity via its own sensor and its own analyzer unit. Savings in sensors and analyzer units are possible here.

The analyzer unit according to the present invention is advantageous in general for all applications which require at least the output signal for controlling/regulating preselectable variables, the first application requiring small values having a high resolution and the other application requiring large values having a low resolution.

DETAILED DESCRIPTION

Figure 1:
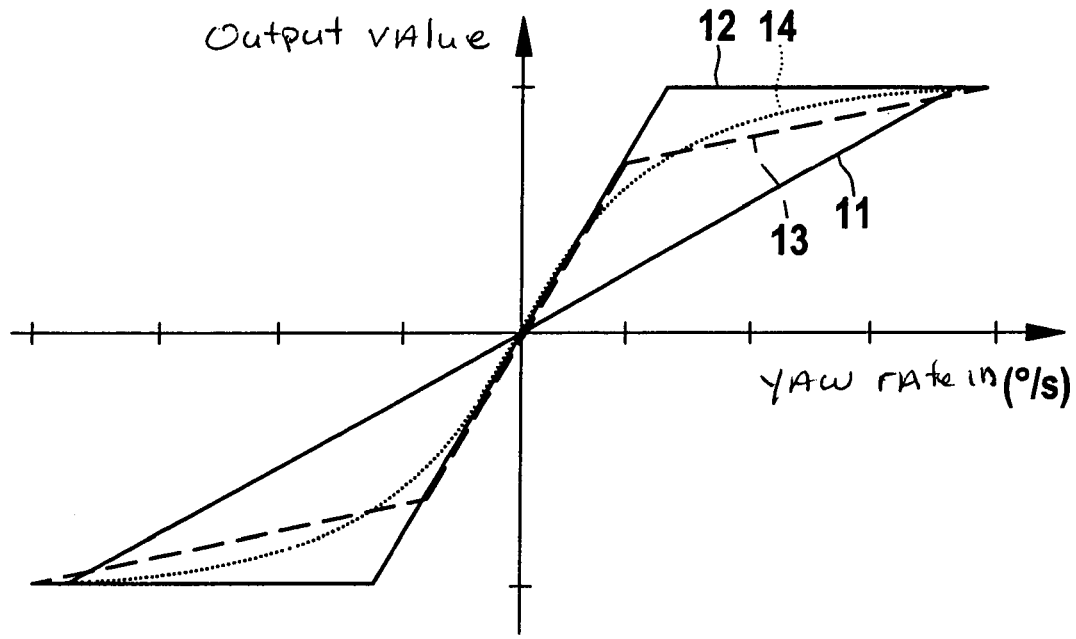
FIG. 1 shows output values plotted as a function of yaw rate in a diagram. Various characteristic curves are shown.

FIG. 1 shows output values in (a.u.) plotted as a function of the yaw rate in (°/s) in a diagram as an example of a micromechanical yaw rate sensor having the analyzer unit according to the present invention.

Characteristic curve 11 is a curve having two linear ranges. Beginning at the origin of coordinates, a first very large range having a constant slope is depicted. This is followed at very high yaw rates by a second small range having a slope of zero. An analyzer unit having this generated characteristic curve permits maximum utilization of the physical measuring range of the sensor. It is thus suitable for applications which preferably process measured values from a wide measuring range.

Characteristic curve 12 also has a curve with two linear ranges. The first range has a much greater slope in comparison with that of characteristic curve 11 and it ends at much lower yaw rates. This is followed by a correspondingly longer second range having a slope of zero. An analyzer unit having characteristic curve 12 maximally utilizes the physical resolution of the sensor. With the same value range of the output value, however, the measuring range of the yaw rate is much smaller than in the case of characteristic curve 11. The analyzer unit having characteristic curve 12 is thus suitable for applications processing preferably high-resolution measured values from a relatively small measuring range.

The features of characteristic curves 11 and 12 are combined in characteristic curve 13. A first range having a relatively large slope and thus a high resolution is followed by a second range having a relatively small slope but maximal utilization of the measuring range. An analyzer unit having characteristic curve 13 is therefore suitable for applications processing preferably high-resolution measured values from a relatively small measuring range as well as for applications processing preferably measured values from a wide measuring range.

Characteristic curve 14 has the features of characteristic curve 13, but it differs in that the slope changes continuously. In the case presented here, the characteristic curve has the shape of a root function.

Figure 2:
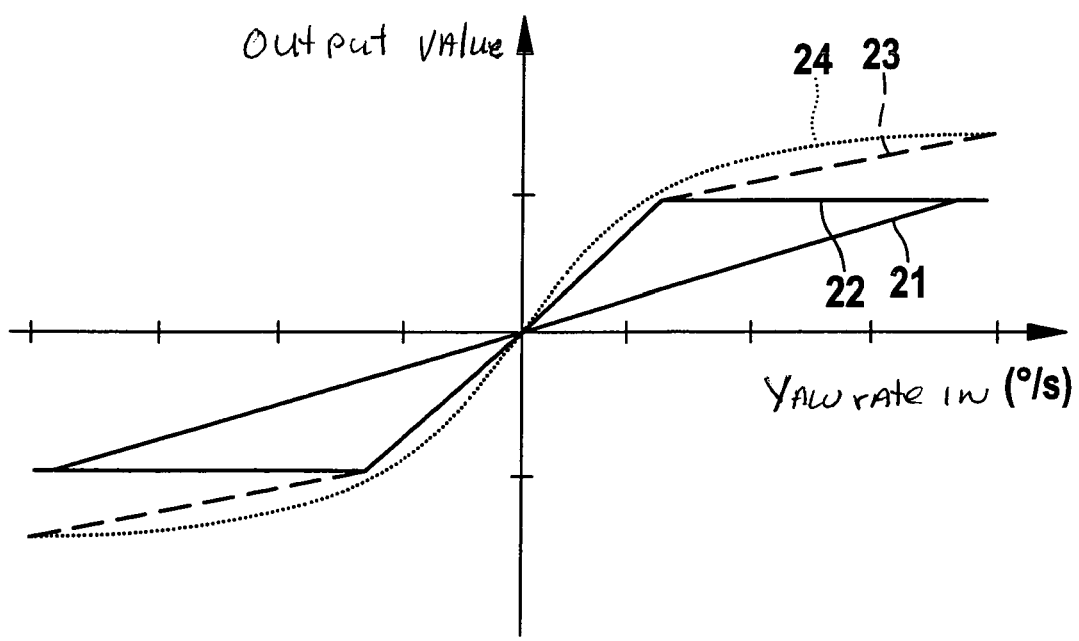
FIG. 2 shows output values plotted as a function of yaw rate in a diagram. Various characteristic curves are shown with various value ranges.

FIG. 2 shows sensor output values plotted as a function of yaw rate in (°/s) in a diagram. Characteristic curves 21 and 22 correspond to characteristic curves 11 and 12 from FIG. 1. Characteristic curves 23 and 24 correspond to characteristic curves 13 and 14 from FIG. 1 but they have a greater slope in general and thus have a higher resolution. This is made possible by a larger value range of the output values in comparison with characteristic curves 21 and 22.

Figure 3:
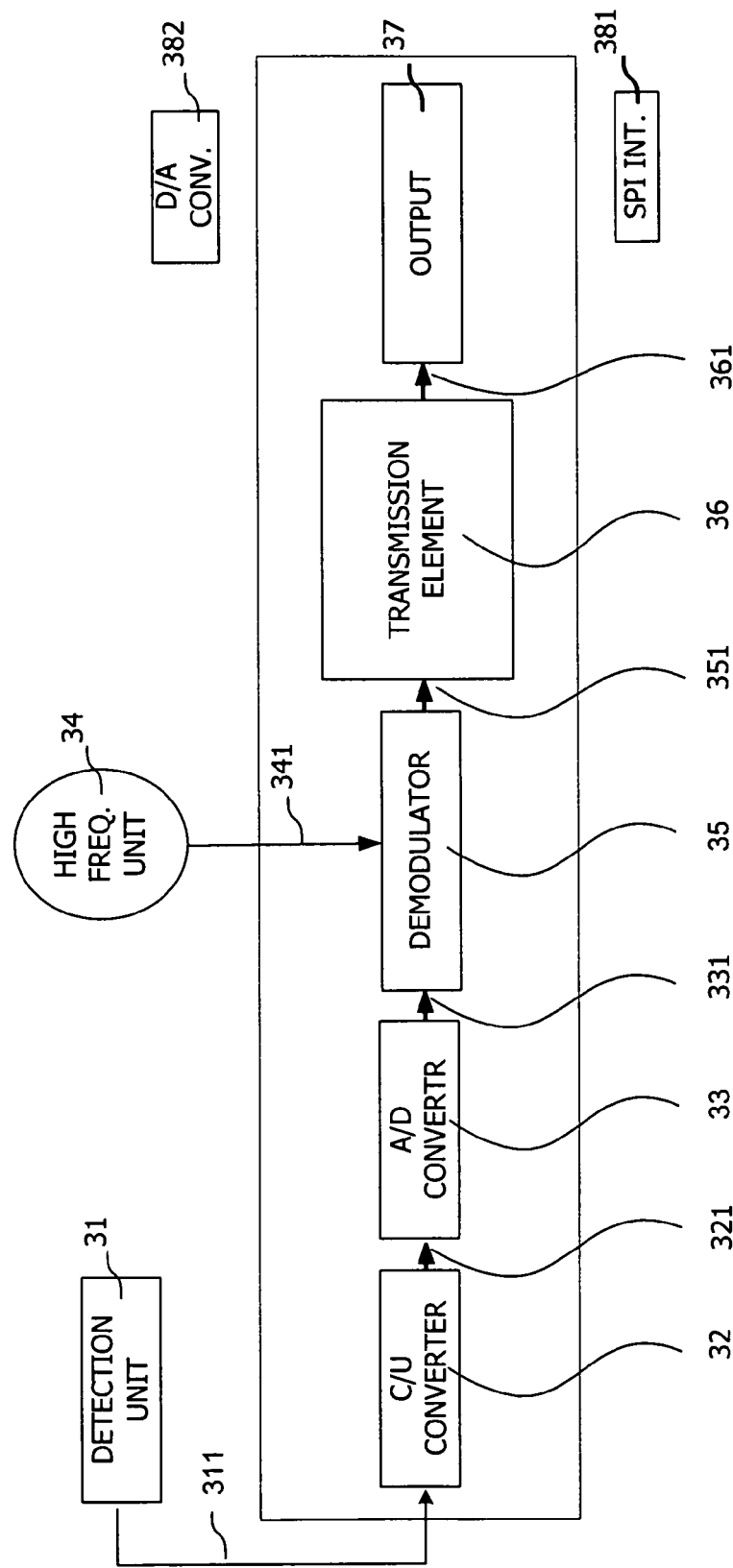
FIG. 3 shows an embodiment according to the present invention of the analyzer unit for the measuring signal of a micromechanical sensor having a transmission function.

FIG. 3 shows as an example an embodiment according to the present invention of the analyzer unit for the measuring signal of a micromechanical yaw rate sensor.

Detection unit 31, i.e., the actual sensor, is connected to the input of the analyzer unit and supplies a raw signal 311 to it. Raw signal 311, which corresponds technically to a capacitance signal in particular and is largely proportional to the yaw rate of the sensor on the basis of the sensor design, is first converted into voltage signal 321 by a capacitance/voltage converter (C/U converter) 32. Voltage signal 321 is then digitized in an A/D converter 33, thus creating a digitized voltage signal 331, and then demodulated in a demodulator 35. A corresponding demodulation signal 341 is supplied for this purpose to demodulator 35 via a high-frequency unit 34 in addition to digitized voltage signal 331 from A/D converter 33. Demodulator 35 generates a demodulated signal 351 which may be filtered through a low-pass filter (not shown here) and sent to a transmission element 36. Transmission element 36 implements a transmission function and generates the output signal in the form of an offset at output 37. Such an output signal 361 may then be supplied to an SPI interface 381, for example. In addition, output signal 361 may be supplied to a digital-analog converter (D/A converter) 382, for example, for further processing.

Figure 4:
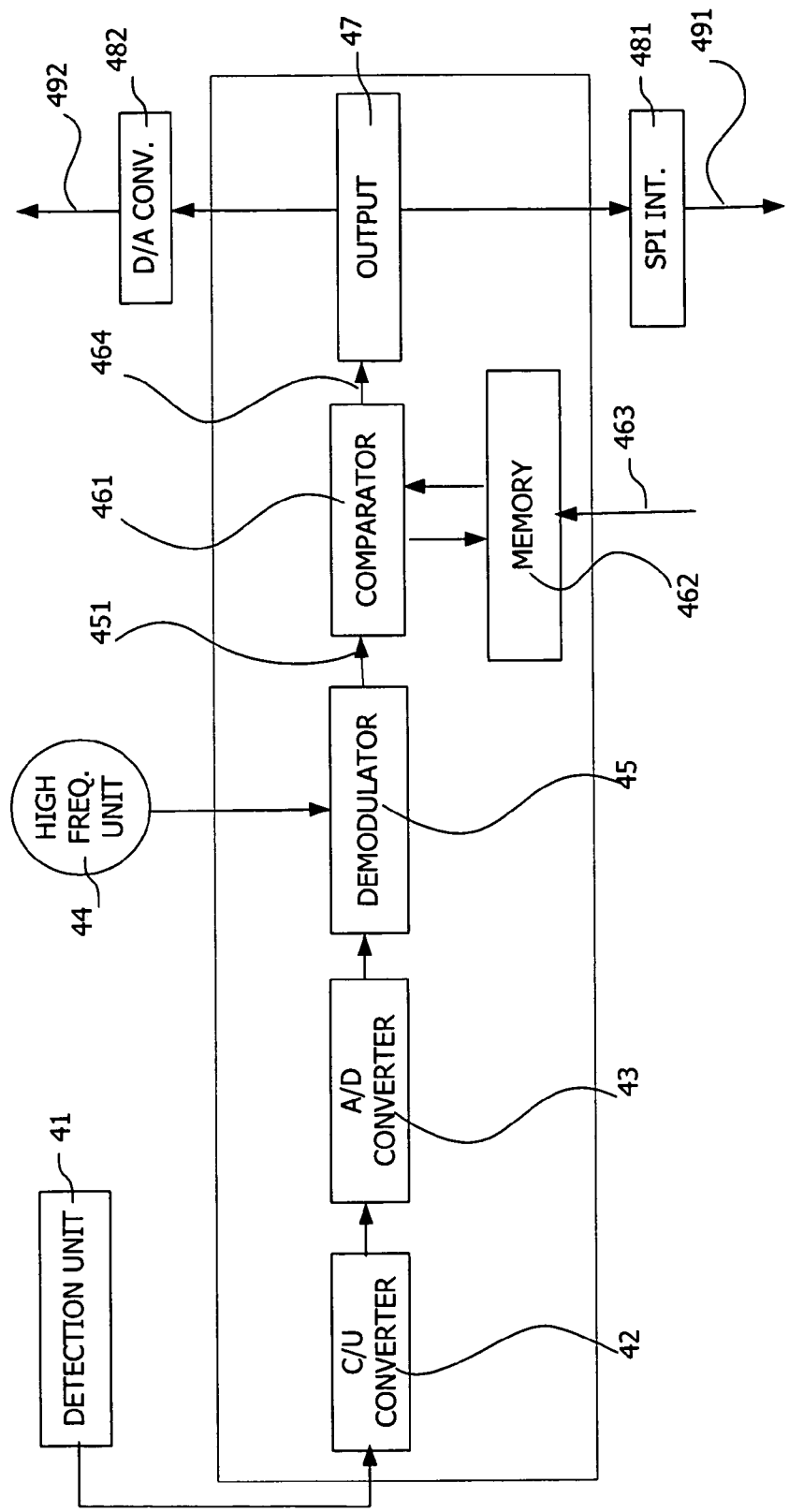
FIG. 4 shows another embodiment according to the present invention of the analyzer unit for the measuring signal of a micromechanical sensor having a transmission function and a comparator element.

FIG. 4 shows another embodiment according to the present invention of the analyzer unit for the measuring signal of a micromechanical sensor including detection unit 41, C/U converter 42, A/D converter 43, high-frequency unit 44, and demodulator 45. The transmission element here includes comparator element 461 and at least one transmission function stored in a memory 462, in particular via a table. Demodulated signal 451 is made available to comparator element 461 by the demodulator. Comparator element 461 determines particular output signal 464, which is made available at output 47 of the analyzer unit, via the values of the transmission function stored in memory 462 for each signal 451. Memory 462 in turn has an input 463. The content of the memory may be altered via this input and/or a suitable characteristic curve may be selected from multiple stored characteristic curves. Output signal 464 may be made available to SPI interface 481 and converted to a serial output signal 491. In addition, output signal 464 may be made available to a D/A converter 482 for further processing and converted to an analog output signal 492.

Figure 5:
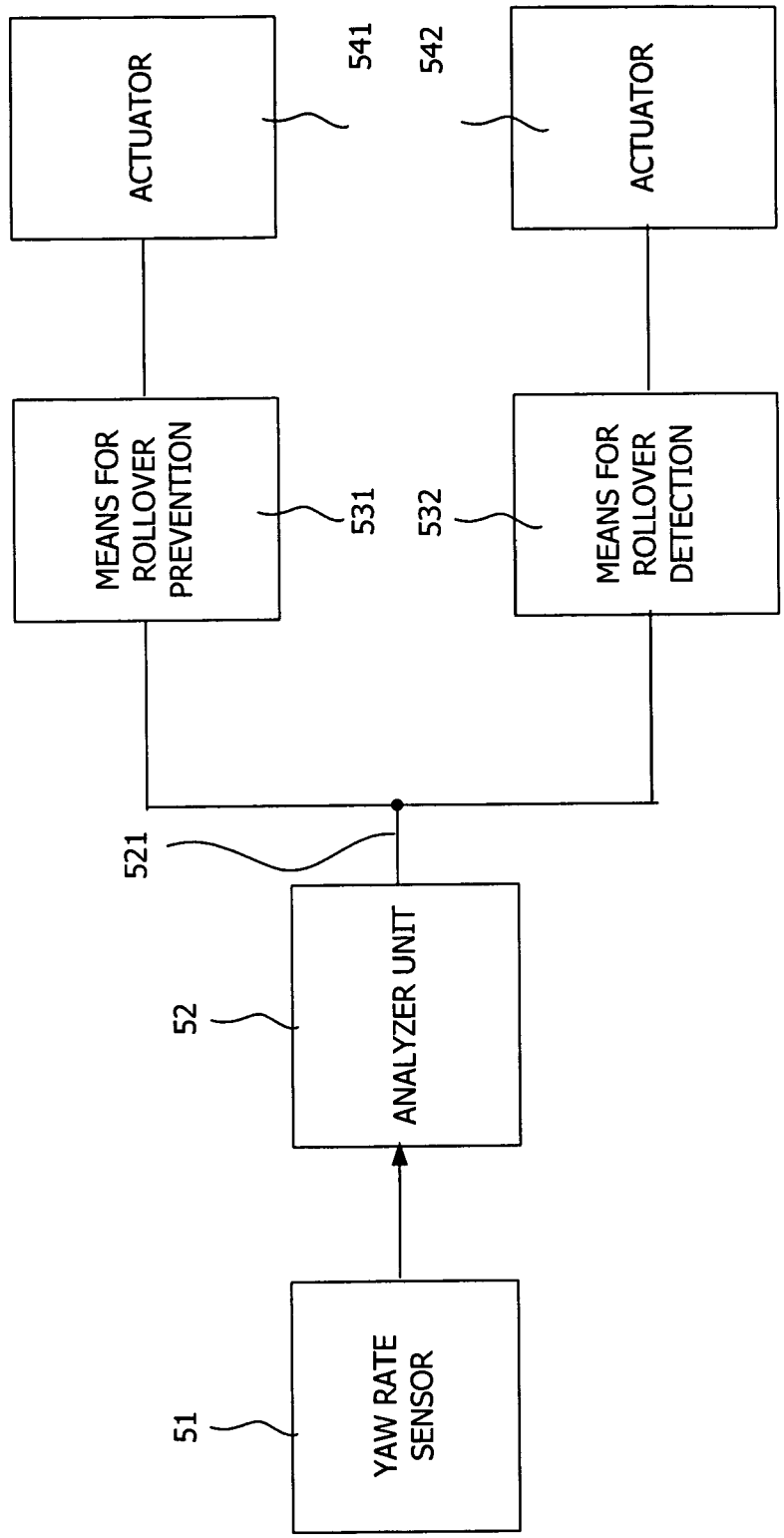
FIG. 5 shows an analyzer unit according to the present invention plus at least two means connected to the output for controlling or regulating preselectable variables.

FIG. 5 shows an analyzer unit according to the present invention having a sensor at the input and two means connected to the output for controlling or regulating preselectable variables. This shows a yaw rate sensor 51 and analyzer unit 52.

Signal 521 applied to the output of the detection unit is made available to a means for rollover prevention 531, in particular an ESP. Means 531 processes signal 521 and outputs a regulating signal which is relayed to an actuator element 541, in particular the brakes, steering, drive or chassis, to prevent the vehicle from rolling over.

Signal 521 applied to the output of the detection unit is also made available to a means for rollover detection 532, in particular an airbag control unit. Means 532 processes signal 521 and outputs a control signal, which is relayed to an actuator element 542, in particular an airbag, to activate the airbag at a suitable point in time in the event of a rollover of the vehicle.

What is claimed is:

1. An analyzer unit including elements for processing a measuring signal of a micromechanical sensor having an input/output characteristic which is represented as a characteristic curve, comprising:
    means for providing an analog-digital conversion of the measuring signal; and
    means for transmitting one of (a) the converted measuring signal and (b) a signal that depends on the converted measuring signal, the means for transmitting being configured such that the characteristic curve has at least two ranges having different slopes, wherein output values from ranges of different slopes are processed by at least two different applications that require at least an output signal for controlling/regulating preselected variables, a first of the applications requiring small values having a high resolution and a second of the applications requiring large values having a low resolution.

2. The analyzer unit according to claim 1, wherein different resolutions of the measuring signal are implemented through the different slopes of the characteristic curve.

3. The analyzer unit according to claim 1, wherein the characteristic curve has at least two linear ranges having different slopes.

4. The analyzer unit according to claim 1, wherein the characteristic curve is represented by a functional relationship.

5. The analyzer unit according to claim 4, wherein the functional relationship is one of an exponential, logarithmic and polynomial relationship.

6. The analyzer unit according to claim 1, wherein the characteristic curve is represented by a freely-selectable transmission function.

7. The analyzer unit according to claim 6, further comprising a memory and a comparator device, wherein the transmission function is stored in discrete values in the memory, an output value belonging to a digitized measured value being determined via the comparator device based on the memory.

8. The analyzer unit according to claim 1, wherein one of (a) a digital signal having a serial protocol is output at an output and (b) an analog signal is output at an output after a digital-analog conversion.

9. The analyzer unit according to claim 1, wherein a value range represented by the characteristic curve and a resolution of the characteristic curve are defined by at least one of (a) a suitable word width of a digital output signal and (b) a suitable voltage range of an analog output signal.

10. The analyzer unit according to claim 1, wherein the micromechanical sensor is one of a yaw rate sensor, an acceleration sensor, an oil pressure sensor, a gas sensor, an air flow sensor, and a temperature sensor.

11. The analyzer unit according to claim 1, wherein the two different applications are navigation and skid detection.

12. The analyzer unit according to claim 1, wherein the two different applications are rollover detection and rollover prevention.

* * * * *